(12) United States Patent
Arroyo et al.

(10) Patent No.: US 10,599,643 B2
(45) Date of Patent: *Mar. 24, 2020

(54) TEMPLATE-DRIVEN STRUCTURED QUERY GENERATION

(71) Applicant: CAPRICORN HOLDINGS PTE. LTD., Singapore (SG)

(72) Inventors: Sinuhé Arroyo, Madrid (ES); José Manuel López Cobo, Madrid (ES); Guillermo Alvaro Rey, Madrid (ES); Silvestre Losada Alonso, Leon (ES)

(73) Assignee: CAPRICORN HOLDINGS PTE, LTD., Singapore (SG)

( * ) Notice: Subject to any disclaimer, the term of this patent is extended or adjusted under 35 U.S.C. 154(b) by 241 days.

This patent is subject to a terminal disclaimer.

(21) Appl. No.: 15/698,097

(22) Filed: Sep. 7, 2017

(65) Prior Publication Data

US 2017/0371923 A1    Dec. 28, 2017

Related U.S. Application Data

(63) Continuation of application No. 14/284,320, filed on May 21, 2014, now Pat. No. 9,785,671.

(60) Provisional application No. 61/846,547, filed on Jul. 15, 2013.

(51) Int. Cl.
  *G06F 16/245* (2019.01)

(52) U.S. Cl.
  CPC .................. *G06F 16/245* (2019.01)

(58) Field of Classification Search
  CPC ........................................ G06F 16/245
  USPC ............................................... 707/779
  See application file for complete search history.

(56) References Cited

U.S. PATENT DOCUMENTS

| | | | | |
|---|---|---|---|---|
| 6,141,659 | A  * | 10/2000 | Barker | G06F 16/33 |
| 7,492,949 | B1* | 2/2009 | Jamieson | G06F 17/248 |
| | | | | 382/217 |
| 8,442,940 | B1* | 5/2013 | Faletti | G06F 17/2785 |
| | | | | 707/610 |
| 8,977,953 | B1* | 3/2015 | Pierre | G06F 17/2785 |
| | | | | 715/230 |
| 2007/0094191 | A1* | 4/2007 | Wu | G06N 5/022 |
| | | | | 706/46 |
| 2009/0112832 | A1* | 4/2009 | Kandogan | G06Q 10/10 |
| 2009/0192968 | A1* | 7/2009 | Tunstall-Pedoe | G06N 5/02 |
| | | | | 706/47 |
| 2009/0216730 | A1* | 8/2009 | Sastry | G06F 16/2428 |

(Continued)

*Primary Examiner* — Evan Aspinwall
(74) *Attorney, Agent, or Firm* — Quarles & Brady LLP

(57) ABSTRACT

An information retrieval system and method are presented. A template is retrieved from a template repository. The template repository stores a plurality of templates. Each of the plurality of templates includes a concept and a relationship from a knowledge model. The knowledge model defines a plurality of entities and interrelationships between one or more of the plurality of entities. The plurality of entities include concepts and instances. The template is transmitted to a client computer, and a statement is received from the client computer. The statement includes an instantiation of the template. A knowledge base is queried using the statement to generate a result listing identifying an item in the knowledge base. The knowledge base identifies a plurality of items. Each of the plurality of items is associated with at least one annotation identifying at one of the entities in the knowledge model.

19 Claims, 8 Drawing Sheets

(56) References Cited

U.S. PATENT DOCUMENTS

| | | | | |
|---|---|---|---|---|
| 2011/0208788 A1* | 8/2011 | Heller | ............ | G06F 8/10 |
| | | | | 707/810 |
| 2014/0074888 A1* | 3/2014 | Potter | ............ | G06F 16/2428 |
| | | | | 707/779 |
| 2014/0280638 A1* | 9/2014 | O'Dell | ............ | H04L 51/12 |
| | | | | 709/206 |

* cited by examiner

TEMPLATE-DRIVEN STRUCTURED QUERY GENERATION

CROSS-REFERENCE TO RELATED APPLICATIONS

This application is a continuation of U.S. Utility application Ser. No. 14/284,320 filed May 21, 2014 and entitled "TEMPLATE-DRIVEN STRUCTURED QUERY GENERATION," which claims priority to U.S. Provisional Patent Application 61/846,547 filed Jul. 15, 2013 and entitled "TEMPLATE-DRIVEN STRUCTURED QUERY GENERATION."

FIELD OF THE INVENTION

The disclosure relates in general to an electronic system for querying a database and, more particularly, to a method and apparatus for enabling a user to generate a query using a template.

BACKGROUND

Different approaches have been taken with respect to information retrieval and search techniques within large database repositories. Typically, the process of information retrieval is triggered by a query entered by a user. Queries, in this context, formally capture the user's information needs, and are aimed at retrieving a set of results that match the query, ordered by relevancy. In most cases, the user input is a string of natural language text, enabling the execution of keyword queries of a database to retrieve a listing of items from the database that are indexed with the same keywords in the repository.

Two important information retrieval systems performance measures are "precision" and "recall". Given a particular query, a set of items in the repository, and an a priori knowledge of document relevancy so that each item is known to be either relevant or non-relevant for a given query, "precision" measures the ratio between the number of relevant items included in the set of query results and the total number of the set of results, while "recall" measures the ratio between the number of relevant items in the set of results and the total number of relevant items in the repository.

Generally, there is a trade-off between recall and precision, so that if precision is increased, recall will be poor, and in turn, if recall is increased, precision will be poor. For keyword-based systems, many systems do not reach 40% for both measures, given that ambiguous words in the query of a queried database might produce erroneous results and that different ways of referring to the items in the database might cause relevant documents not to appear in the results.

BRIEF SUMMARY

The disclosure relates in general to an electronic system for querying a database and, more particularly, to a method and apparatus for enabling a user to generate a query using a template.

In one implementation, the present invention is an information retrieval system, comprising a knowledge model database configured to store a knowledge model for a knowledge domain. The knowledge model defines a plurality of entities and interrelationships between one or more of the plurality of entities. The plurality of entities include concepts and instances. The information retrieval system includes a knowledge base identifying a plurality of items. Each of the plurality of items is associated with at least one annotation identifying at one of the entities in the knowledge model. The information retrieval system includes a template repository storing a plurality of templates. Each of the plurality of templates includes a concept and a relationship from the knowledge model. The information retrieval system includes a query processing server configured to retrieve one of the templates from the template repository, transmit the template to a client computer, receive, from the client computer, a statement, the statement including an instantiation of the template, and query the knowledge base using the statement to generate a result listing identifying an item in the knowledge base.

In another implementation, the present invention includes a method, comprising retrieving a template from a template repository. The template repository stores a plurality of templates. Each of the plurality of templates includes a concept and a relationship from a knowledge model. The knowledge model defines a plurality of entities and interrelationships between one or more of the plurality of entities. The plurality of entities include concepts and instances. The method includes transmitting the template to a client computer, and receiving, from the client computer, a statement. The statement includes an instantiation of the template. The method includes querying a knowledge base using the statement to generate a result listing identifying an item in the knowledge base. The knowledge base identifies a plurality of items. Each of the plurality of items is associated with at least one annotation identifying at one of the entities in the knowledge model.

In another implementation, the present invention includes a non-transitory computer-readable medium containing instructions that, when executed by a processor, cause the processor to perform the steps of retrieving a template from a template repository. The template repository stores a plurality of templates. Each of the plurality of templates includes a concept and a relationship from a knowledge model. The knowledge model defines a plurality of entities and interrelationships between one or more of the plurality of entities. The plurality of entities include concepts and instances. The instructions are configured to cause the processor to perform transmitting the template to a client computer, receiving, from the client computer, a statement, the statement including an instantiation of the template, and querying a knowledge base using the statement to generate a result listing identifying an item in the knowledge base. The knowledge base identifies a plurality of items. Each of the plurality of items is associated with at least one annotation identifying at one of the entities in the knowledge model.

DETAILED DESCRIPTION OF THE DRAWINGS

Figure 1:
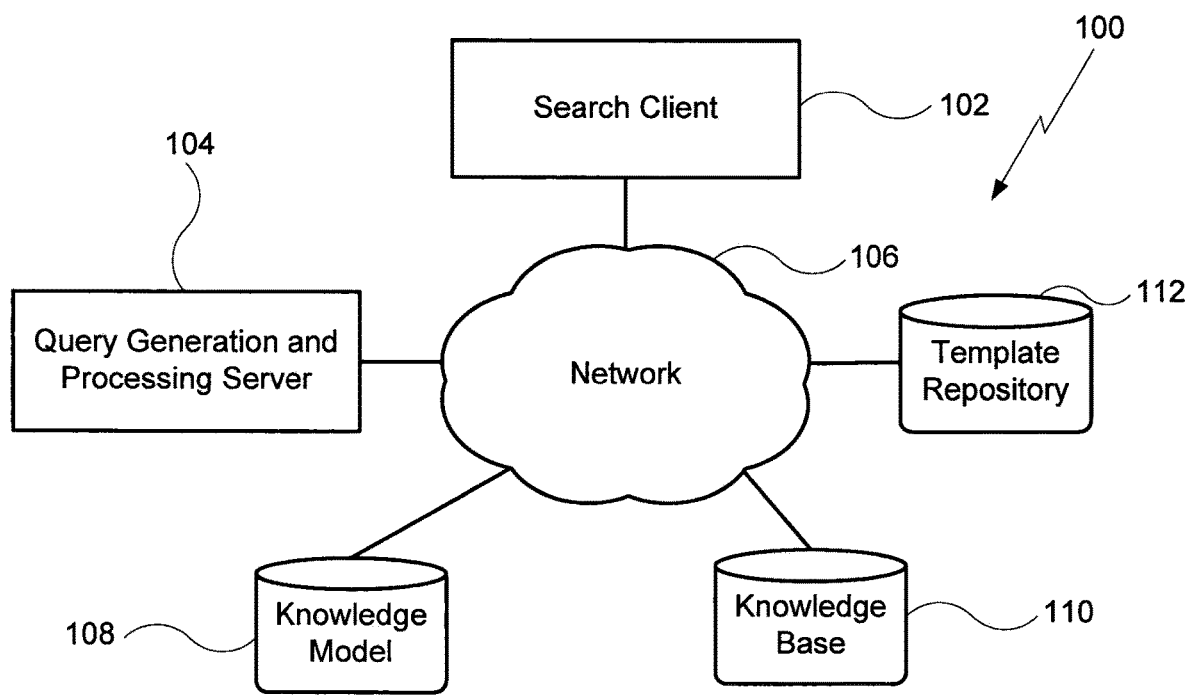
FIG. 1 is a block diagram illustrating one example configuration of the functional components of the present information retrieval system.

The disclosure relates in general to an electronic system for querying a database and, more particularly, to a method and apparatus for enabling a user to generate a query using a template.

This invention is described in embodiments in the following description with reference to the Figures, in which like numbers represent the same or similar elements. Reference throughout this specification to "one embodiment," "an embodiment," "one implementation," "an implementation," or similar language means that a particular feature, structure, or characteristic described in connection with the embodiment is included in at least one embodiment of the present invention. Thus, appearances of the phrases "in one implementation," "in an implementation," and similar language throughout this specification may, but do not necessarily, all refer to the same embodiment.

The described features, structures, or characteristics of the invention may be combined in any suitable manner in one or more implementations. In the following description, numerous specific details are recited to provide a thorough understanding of implementations of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Any schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present system and method provides a mechanism in which users can construct a formal query composed of statements that comply with an underlying structured knowledge model. In one implementation, the statements define a structured relationship between entities that may be associated with one or more documents in a knowledge base (described below). Such a structured query, including one or more such statement, is able to retrieve a relevant set of results from a document repository (e.g., a knowledge base) in which each document has been annotated with the same kind of statements compliant with a knowledge model (described below).

For a given subject matter, the present system provides both a knowledge model and a knowledge base. The knowledge model includes an ontology that defines concepts, entities, and interrelationships thereof for a given subject matter or knowledge domain. The knowledge model, therefore, normalizes the relevant terminology for a given subject matter domain. The knowledge model may be implemented in a graph structure, in which a set of entities are related through formal relationships. As will be described further below, these formal relationships between entities in the knowledge model are utilized in constructing a number of templates that may be employed by user to facilitate the search process. In the present disclosure, reference is made to ontologies as a mechanism to describe the relationship between a number of entities, however any other equivalent or similar model with a graph structure may be utilized in place of the ontologies of the present disclosure.

The knowledge model may be composed of different ontological components that define the knowledge domain. The components can include concepts, instances, and relationships. Concepts (Classes), which are abstract objects of a given domain (in the present disclosure the knowledge domain of "sports" may be used for a number of non-limiting examples) such as categories or types; an example of a concept would be "basketball player", "team" or "three-point field goal"; Instances (Individual objects) are concrete objects, for example a given player such as "Pau Gasol" or a team like "Los Angeles Lakers"; Relationships (relations) how objects (including both concepts and instances) in the knowledge model relate to other objects, for example the relationship "plays for" links the concept "basketball player" with the concept "team", and also may link the concrete instance "Pau Gasol" with the instance "Los Angeles Lakers". In some cases, two terms may be directly connected through more than one relationship; for example, the concept "basketball player" and the concept "team" may also be related through the "plays against" relationship. The terms of the knowledge model include concepts, instances and relationships of a given domain to be used within a specific application are usually modeled by hand by ontology engineers. Such modeling is a process where arbitrary decisions need to be taken to relate the terms of the knowledge model, and even though there are standard vocabularies and ontologies, the same domain may be modeled in different ways in different knowledge models.

The knowledge base, in contrast, is the store of information that the information retrieval system is configured to search. The knowledge base is a database including many items (or references to many items) where the items can include many different types of content (e.g., documents, data, multimedia, and the like) that a user may wish to search. The content of the knowledge base can be stored in any suitable database configured to store the contents of the items and enable retrieval of the same. To facilitate searching, the items in the knowledge base can each be associated with different terms (e.g., concepts, instances, and/or relationships) contained within the knowledge base. This association can be made explicitly (e.g., through the use of metadata associated with the content), or implicitly by the item's content. With the items in the knowledge base catalogued using information from the knowledge model, the knowledge model becomes an index or table of contents by which to navigate the contents of the knowledge base.

FIG. 1 is a block diagram illustrating one example configuration of the functional components of the present information retrieval system 100. System 100 includes search client 102. Client 102 includes a computer executing software configured to interact with query generation and processing server 104 via communications network 106. Client 102 can include a conventional desktop computer or portable devices, such as laptops computers, smart phones, tablets, and the like. A user uses client 102 to submit a query and then view the results of that query after execution of the query against a particular knowledge base.

Query generation and processing server 104 is configured to interact with client 102 to perform a query. In one implementation, the query is constructed using a template, where the template describes a candidate relationship between search terms, where the candidate relationship is one found in the relevant knowledge model and the search terms, in one implementation, may be concepts selected from the same knowledge model. Query processing server 104 provides the candidate template to the client 102 and receives, in response, a query having a structure that is compliant with the candidate template. Query processing server 104 then uses the template-based query to query a knowledge base to generate a listing of items in the knowledge base that satisfy the template-based query.

To perform these tasks, query generation and processing server 104 accesses knowledge model database 108, which contains the knowledge model (i.e., the concepts, instances and relationships that define the subject matter domain). Once a query has been created, query generation and processing server 104 executes the query against knowledge base database 110, which stores the knowledge base and any metadata or annotations describing the items of the knowledge base. In knowledge base database 110, the items to be retrieved are generally annotated with one or more of the terms available in the knowledge model. Template repository 112 is a database storing a number of templates for potential queries of knowledge base 110. When a user wishes to query knowledge base 110, query generation and processing server 104 may access template repository 112 to retrieve a number of candidate templates therefrom, where the candidate templates describe candidate structures for queries of knowledge base 110. Those candidate templates can then be provided to client 102 for selection. Once a candidate template has been selected and completed by client 102, query generation and processing server 104 receives the completed query and executes the query against knowledge base 110.

A knowledge model may be constructed by hand, where engineers (referred to as ontology engineers) lay out the model's concepts, instances and relationships and the relationships thereof. This modeling is a process where domain-specific decisions need to be taken, and even though there exist standard vocabularies and ontologies for different knowledge domains, it is worth noting the same domain may be modeled in different ways and that knowledge models may evolve over time. Sometimes the knowledge model is used as a base and the model's individual components are considered static, but the present system may also be implemented in conjunction with dynamic systems where the knowledge model varies over time.

A knowledge model may define the relationships between a number of terms that may be present in the annotations or metadata associated with different items in the knowledge base. In that case, the knowledge model contains a schema of abstract concepts and their relationships. In the case of a knowledge model for the basketball domain, for example, the knowledge model may define concepts such as "basketball player" and "team" and their connection through the "plays for" relationship. Optionally, the knowledge model may also contain concrete instances with their respective general assertions in the domain, such as concrete basketball player like "Pau Gasol" or teams like "Los Angeles Lakers", and the relationships amongst them.

One possible implementation of the knowledge model, considering the particular example of semantic (ontological) systems could be a "triplestore"—a repository or database that is purpose-built for the storage and retrieval of semantic data in the form of "triples" (or "statements" or "assertions"). Triplestores are well known types of databases and are routinely implemented to managed knowledge models. The concept of "triple" in this sense is to be understood in a broad sense as a data entity that follows a subject-predicate-object (s,p,o) pattern (e.g., subject predicate object). Generally, the subject and object of a triplestore can include concepts or instances selected from the relevant knowledge model, while the predicate is a relationship also selected from the relevant knowledge model, although other similar data models may be used. An example triple constructed from two concepts and a valid relationship in the basketball domain would be ("basketball player", "plays for", "team"). As a possibility in this respect, a semantic data model widely extended for expressing these statements is the Resource Description Framework (RDF). Query languages like SPARQL are one possibility for retrieving and manipulating RDF data stored in triplestores, although other mechanisms are also possible.

The knowledge model thus contains the relationships amongst the different types of resources in the application domain. The knowledge model contains both the (ontological) schema of abstract concepts and their relations (see, for example, the knowledge model graph shown in FIG. 3) such as ("basketball player", "plays for", "team"), as well as instances with their respective general "static" assertions valid for the whole domain, such as concrete "basketball players" like "Pau Gasol" or "Kobe Bryant", and their relationship to the teams they play for, etc. As explained above, the ontology-engineering task by which the model is configured can be a manual process, though it might utilize semi-automatic support by previously identifying the kind of concepts and instances that will be relevant for the domain.

As an example, in the particular scenario of triple-based statements, the abstract concept-relationship-concept (C,r,C) statement like ("basketball player", "plays for", "team") could be stored in the knowledge model as a triple statement, along with specific instances in the domain such as "Pau Gasol" (and the instance's association to the "basketball player" concept) or "Los Angeles Lakers" (which belongs to the "team" concept), and their respective relationships for the whole domain.

In other implementations of the knowledge model, other types of repositories, instead of triplestore-based knowledge models, are also able to contain and define the entities and relationships of the knowledge model.

The knowledge base is the repository that contains the items or content that the user wishes to search and retrieve. The knowledge base may store many items including many different types of digital data. The knowledge base, for example, may store plain text documents, marked up text, multimedia, such as video, images and audio, programs or executable files, raw data files, etc. The items can be annotated with both particular instances (e.g., "Pau Gasol") and concrete assertions ("Pau Gasol", "plays for", "Spanish national team") selected from the knowledge model, which are particularly relevant for the given item. One possible implementation of the knowledge base is a Document Management System that permits the retrieval of documents via an index of the entities of the knowledge base. To that end, documents in the repository need to be associated to (or "annotated with") those entities.

For each annotation in the knowledge base, both concepts (e.g., "basketball player") and particular instances (e.g., "Pau Gasol") from the knowledge model may have been used to build the annotation statement. If the underlying knowledge model is a semantic model, the statements can take form as triple-based (s,p,o) assertions.

In the case that the knowledge model is a semantic model and is constructed using triple statements, there may be four possible combinations for the triple-based statements that can be used to annotate the items in the knowledge base: (C,r,C), (C,r,I), (I,r,C) and (I,r,I), where 'C' stands for "Concept", 'I' stands for "Instance" and 'r' stands for "relationship". As such, a particular item in the knowledge base may be annotated with, respectively, abstract statements that include concepts and no instances (e.g., ("basketball player", "plays for", "team")), more precise statements where one of the concepts is replaced with an instance (e.g., ("basketball player", "plays for", "Los Angeles Lakers") or ("Pau Gasol", "plays for", "team")), or statements that include no concepts and only instances and relationships (e.g., ("Pau Gasol", "plays for", "Los Angeles Lakers")). Again, in other implementations, these types of statements may be modified if the underlying knowledge model is not based on triples.

With respect to the association of triple statements to documents in the knowledge base (i.e., annotation), different approaches can be utilized. In particular, the process of annotation can be performed both manually, with users associating particular statements to the knowledge base item, and automatically, by detecting which references to concept, entities, and/or relationships appear in each item in the knowledge base, and matching them to triple-based statements from the knowledge model. The documents in the knowledge base are then indexed according to the structured statements that appear in or have been associated to them.

The techniques described herein can be applied to repositories of documents in which annotations have been performed through different manners. The process of annotation for the documents may have been performed both manually, with users associating particular concepts and instances in the documents to particular entities in the knowledge model, and/or automatically, by detecting which references to entities appear in each knowledge base item. Systems may provide support for manual annotations by facilitating the user finding and selecting entities from the knowledge model, so these can be associated to items in the knowledge base. For example, in a possible embodiment, the system may offer auto-complete functionality so when the user begins writing a portion of a word, the system might suggest a potential completion for the word. The user may decide then to annotate a given item with the chosen instance, i.e., to specify that the entity from the knowledge model is associated to the particular item in the knowledge base.

When automatically creating metadata for the knowledge base items, techniques like text parsing and speech-to-text over the audio track or a multimedia item can be used along with image processing for videos. In this manner, it is possible to associate each of the items in the knowledge base (or even portions of the items), with the entities (e.g., concepts, instances, and relationships) that are present in the relevant knowledge model. This process is dependent on the knowledge model because the identification of entities in the knowledge base item is performed in reliance upon the knowledge model. For example, the visual output of certain documents (e.g., images or video) can be analyzed using optical character recognition techniques to identify words or phrases that appear to be particularly relevant to the document. These words or phrases may be those that appear often or certain words or phrases that may appear in a corresponding knowledge base. For example, when operating in the sports knowledge domain, when a document includes words or phrases that match particular concepts, instances, relationships, or entities within the knowledge domain (e.g., the document includes the words "football", "Pele", and "World Cup") the document can be annotated using those terms as they relate to either concepts, instances, or relationships in the knowledge model. For documents containing audio, the audio output can be analyzed using speech to text recognition techniques to identify words or phrases that appear to be particularly relevant to the document. These words or phrases may be those that are articulated often or certain words or phrases that may appear in a corresponding knowledge base. For example, when operating in the sports knowledge domain, when a document includes people discussing particular concepts, instances, or relationships within the knowledge domain, the document can be annotated using those terms.

Additionally, a combination of approaches (semi-automatic techniques) is also possible for annotating the knowledge base. The result of such annotation techniques is that the items in the knowledge base repository are then indexed with metadata according to the entities (knowledge model concepts, instances and/or relationships) that appear in or have been associated to the items.

In the case of manual annotation, terms that belong to the knowledge model are associated with the items in the knowledge base. Different techniques for encouraging users to participate in the manual annotation of content may be applied, like the use of Games with a Purpose to leverage the user's interactions while they play. Again, the underlying knowledge model and the model's design define the kinds of annotations that can be applied to the items in the knowledge base.

The template repository 112 (see FIG. 1) contains a collection of templates (abstract statements) that relate one or more concept, instance, or relationship from the knowledge mode. The templates can be used to assist users in the construction of specific queries that may be executed against the knowledge base. The notion of a template as "abstract statement" refers to an assertion composed of entities that can be modified ("instantiated") by the user. In general, the templates will be composed of abstract concepts (as opposed to concrete instances) and a valid relationship that links the concepts, but it is also possible to implement the system using different types of templates, e.g., that relate one instance and one concept.

The set of possible templates for a given knowledge mode, therefore, will normally be a subset of the global set of potential statements available in the knowledge model. In the specific implementation, where the knowledge model is constructed using triple-based statements, the templates may be in the form of concept-relationship-concept (C,r,C) triples like ("basketball player", "plays for", "team").

When creating a search, users are presented with one or more templates. The user can then replace one or more of the concepts in the template with specific instances (thereby "instantiating" the template) to create a statement, thereby making the template more precise. These statements can then be added to a query, which can then be executed against the knowledge base. In the specific case of semantic triple-based templates, the user may modify either the subject or the object in the template to create a statement that may be added to a query. Again, variations of this approach may be implemented are possible; for example, the system may alternatively allow the user to change the relationship in the template, but not the entities, etc.

In general, the construction of the templates can be dependent on the particular implementation of the underlying knowledge model. As such, the concept-relationship-concept (C,r,C) template discussed above is thus just a possible template in the case of triple-based statements, but other template configurations could be implemented for different types of knowledge models. Additionally, the templates may also feature other kinds of elements, e.g., operators to be applied in combination with the abstract statement itself. Some embodiments may also consider different approaches towards the templates in the template repository upon the modification of the knowledge base, e.g., if concepts are deleted or modified in the knowledge model. One possibility is that templates are deleted or modified accordingly, but it may also be the case that templates are left untouched independently of the modifications in the knowledge base.

Depending upon the system implementation, different processes for creating a suitable list of candidate templates may be utilized. In one implementation, a set of templates can be created or selected manually. In that case, individuals familiar with the knowledge model and the types of searches that are likely to be executed against the target knowledge base may decide which candidate templates would be of special relevance in the context of the given knowledge model. Those templates may then be made available for use in querying the knowledge base. Alternatively, the generation of candidate templates may take place through automatic algorithms, for example by detecting those combinations of entities within the knowledge model that are particularly relevant in relation to the knowledge base through the knowledge base annotations. Finally, embodiments may also consider the combination of manual and automatic techniques for the detection and creation of suitable candidate templates.

Figure 2:
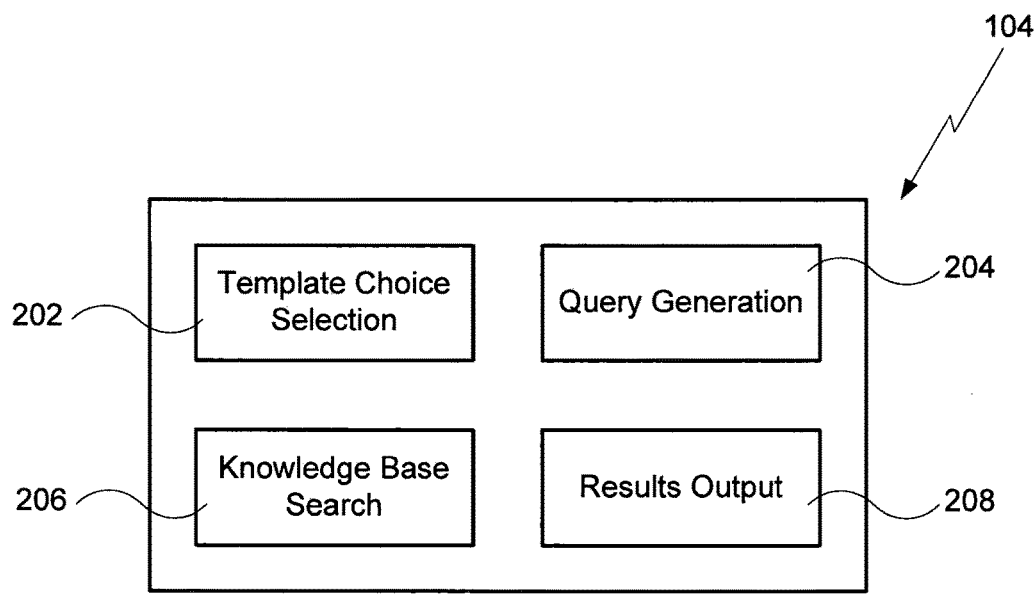
FIG. 2 is a block diagram showing functional components of a query generation and processing system.

FIG. 2 is a block diagram showing the functional components of query generation and processing server 104. Query generation and processing server 104 includes a number of modules configured to provide one or more functions associated with the present information retrieval system. Each module may be executed by the same device (e.g., computer or computer server), or may be distributed across a number of devices.

Template choice reception module 202 is configured to select a number of candidate templates from template repository 112 and allow a user to select one or more of the candidate templates (e.g., using client 102). Template choice reception module 202 may also enable the user to instantiate one or more of the selected templates to create statements by entering specific information into one or more fields within the selected template.

Query generation module 204 is configured to generate a structured query using the templates selected and modified by the user (e.g., using client 102) and any additional query terms or phrases that may be provided by the user.

Once a query is created, knowledge base search module 206 is configured to take the query generated by query generation module 204 and execute the query against the desired knowledge base.

Results output module 208 is configured to retrieve the items (or links thereto) that are relevant to an executed query (performed by knowledge base search module 206) executed against the knowledge base and provide an appropriate output to the user via client 102. In addition to the items themselves, results output module 208 may be configured to generate statistics or metrics associated with the resulting items and depict that data to the user. Results output module 208 may, for example, also depict a graph showing the relevant knowledge model entities that are present in the search results. Results output module 208 may also display one or more available templates (including, possibly, the templates as-modified by the user) thereby enabling the user to add templates, or modify the selected templates in order to further refine a search query.

Figure 3:
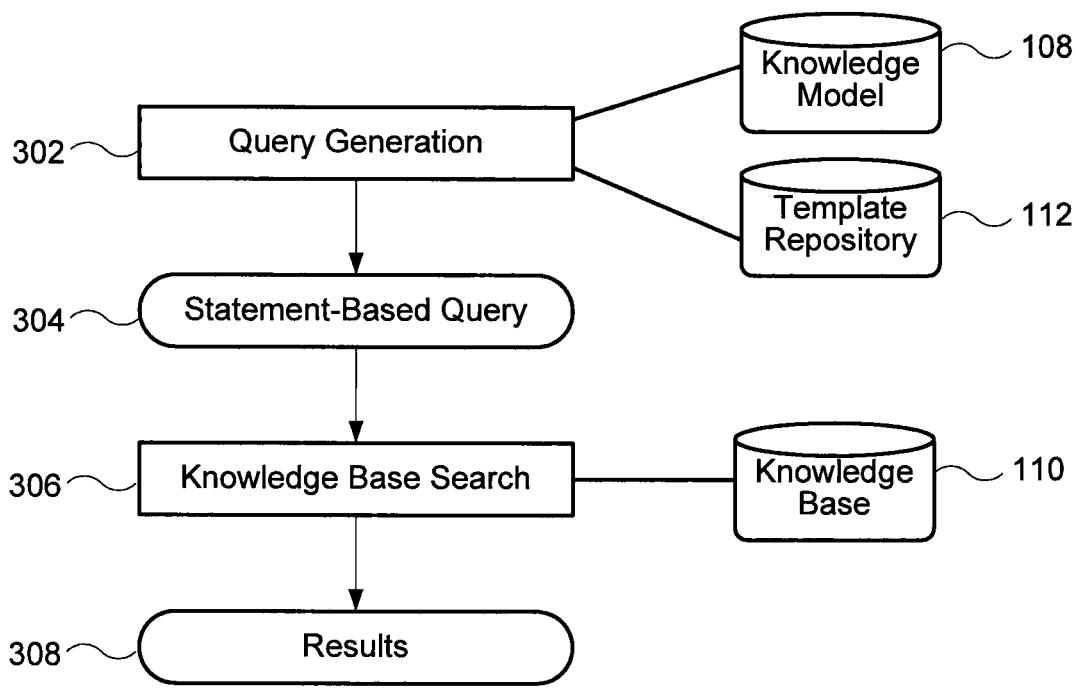
FIG. 3 is a flowchart illustrating an exemplary method for performing a query in accordance with the present disclosure.

FIG. 3 is a flowchart illustrating a method for building a structured query using templates. Generally, the method includes two steps, first query generation, and then a knowledge base search. During query generation (see step 302), the user selects one or more templates for a particular knowledge model 108 from template repository 112. The user can then enter specific data into one or more of the templates (for example, by replacing the concepts in a particular template with specific instances) to instantiate the template and thereby create a statement. One or more statements can then be combined into a query. In some implementations, the user can provide additional search terms, keywords, or natural language that can be incorporated into the query along with the statements. In step 304, the information provided by the user (including instantiated templates and additional search terms) is combined to form a query. In step 306, the query generated in step 304 is executed against knowledge base 110. After performing the query, a set of results is generated in step 308 that may be displayed for the user.

The outcome of the process illustrated in FIG. 3 is a set of results that includes a list of items having metadata that matches the structured query specified by the user. For simplicity, FIG. 3 illustrates the approach in a single iteration. However, the process may be repeated any number of times, alternating between the generation of queries and their use to search over the knowledge base. This approach enables searching in an iterative manner, making it possible to refine the search results through the addition of new statements to the query, or by modifying or deleting the existing ones.

Figure 4:
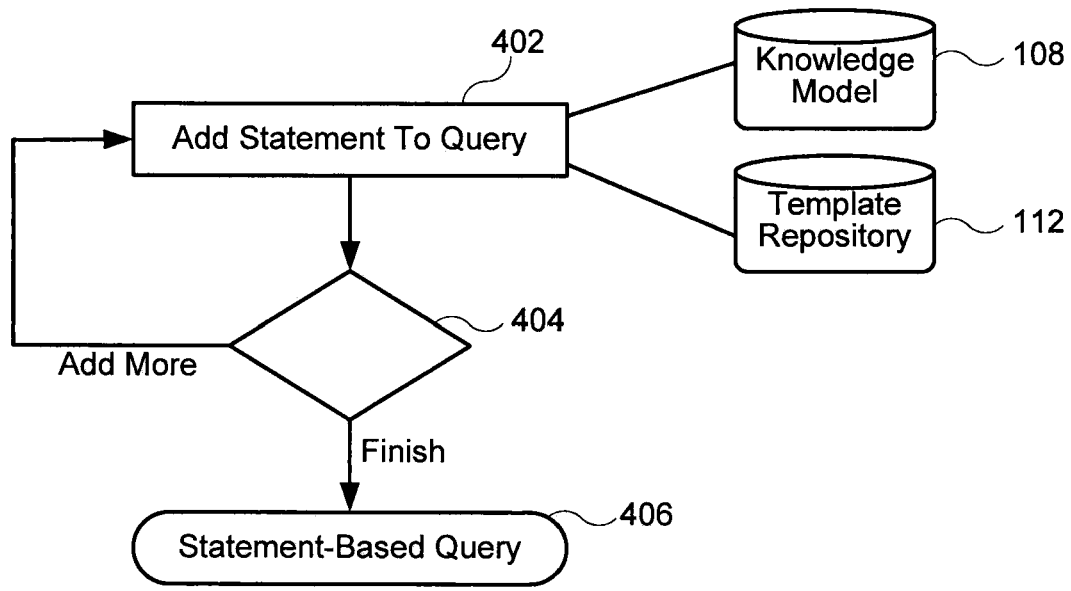
FIG. 4 is a flowchart illustrating details of the method illustrated in FIG. 3.

In some cases, the user may add multiple instantiated templates (also referred to as statements) to a query. FIG. 4, for example, is a flowchart illustrating a query generation process in which a user may add multiple statements to a query. The method depicted in FIG. 4, for example, may be a sub-process performed as part of step 302 of FIG. 3. Referring to FIG. 4, in step 402 the user selects a template from a number of candidate templates (e.g., provided by template choice selection module 202 of query generation and processing server 104). The user can then revise the selected template, for example by modifying the template to replace concepts with specific instances, thereby creating a statement. Once created, the statement may be added to the query (e.g., by query generation module 204). In step 404 the user decides whether to add an additional template or statement to the query. If so, the method returns to step 402 and the user can select an additional template in order to create another statement. If not, in step 406 the completed statement or revised templates can be added to a query for executing against a knowledge base.

The user may add any number of statements (or completed templates) to a query, by making use of the templates from template repository 112 and then contextualizing the templates by instantiating parts of the templates with elements from the knowledge model to create statements.

Figure 5:
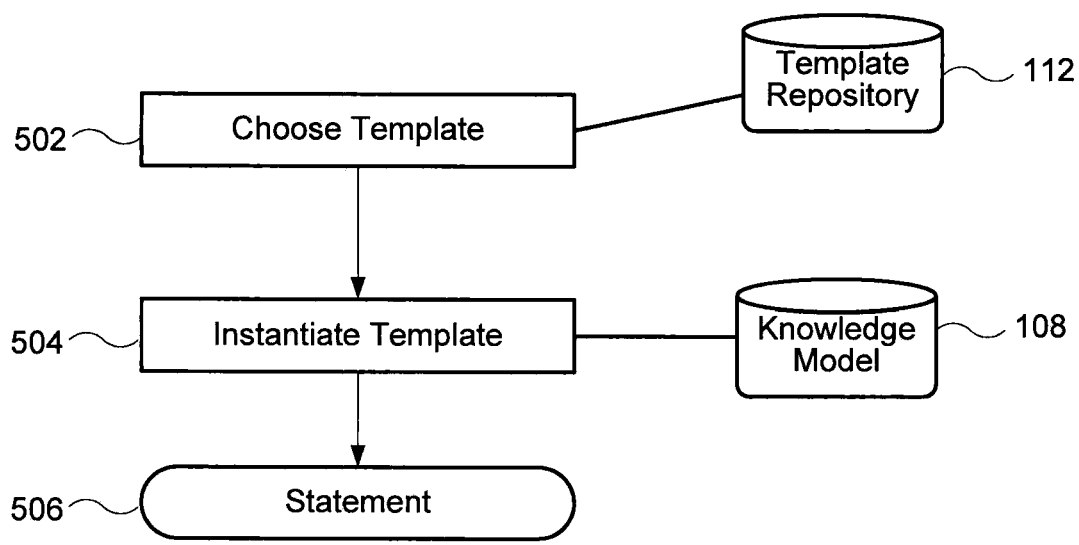
FIG. 5 is a flowchart for a method for a user to select and instantiate a template.

FIG. 5 is a flowchart illustrating a method for the addition of a new statement to a query. In step 502, the user selects a template from template repository 112. When selecting from existing templates, the user may be presented with a list of existing templates in the template repository 112, from which one or more templates may be selected. Alternatively, the user can navigate through existing templates by searching for the templates in a tree structure, or through a query box, etc.

Besides choosing a template from the repository, it might be the case that the system allows for the creation of new templates. When creating a new template, the user may combine concepts from the knowledge model 108 through valid relationships in order to construct a template. After a new template is constructed, the user may choose to store the new template in template repository 112 so that the new template becomes available for future searches and may be available for other users. In the specific case of triple-based statements, the user may combine two different concepts through a valid relationship in order to create a new (C,r,C) template.

Figure 8A:
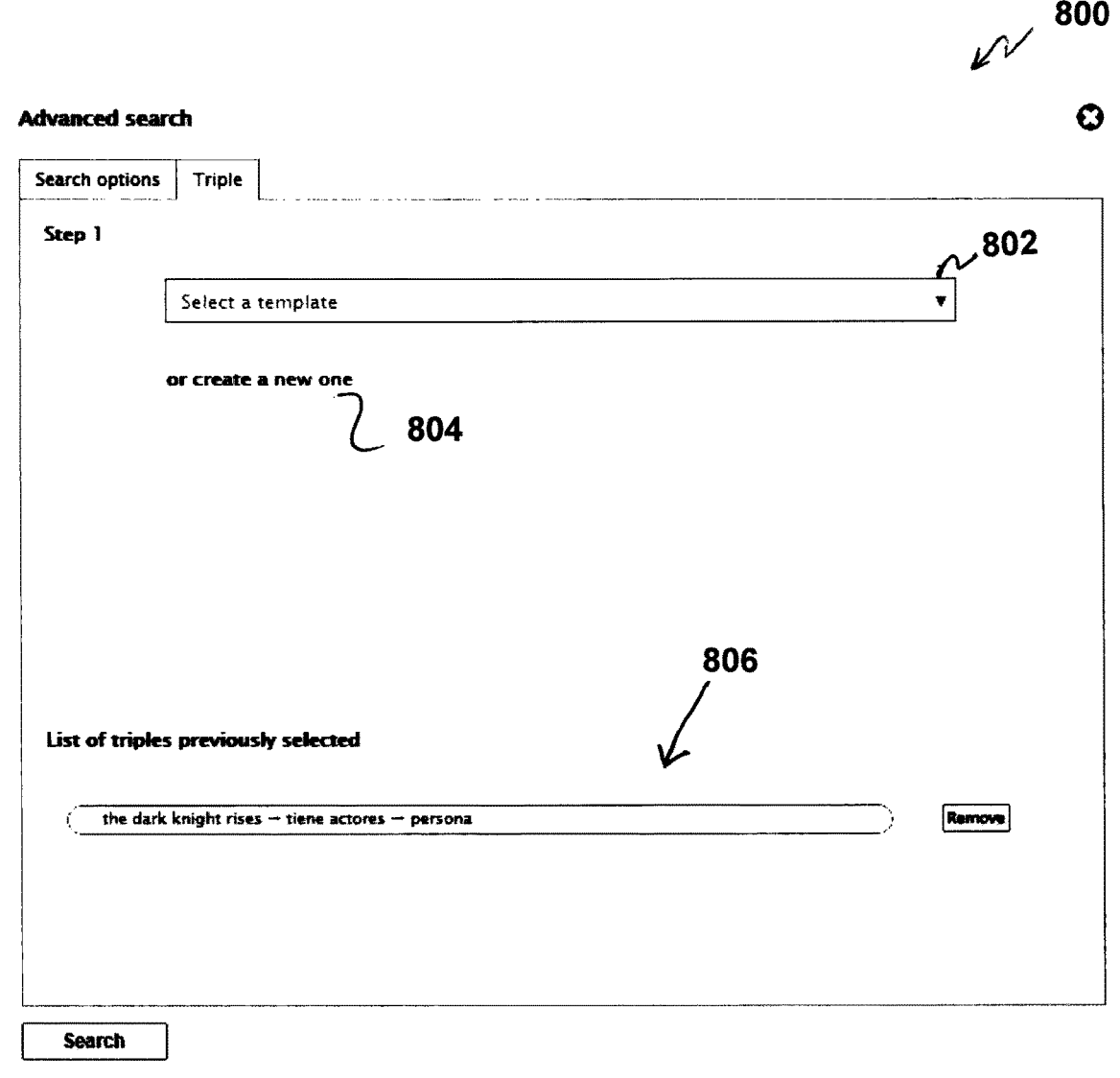
FIGS. 8A-8D are screenshots illustrating example user interfaces depicted by the present system
Figure 8B:
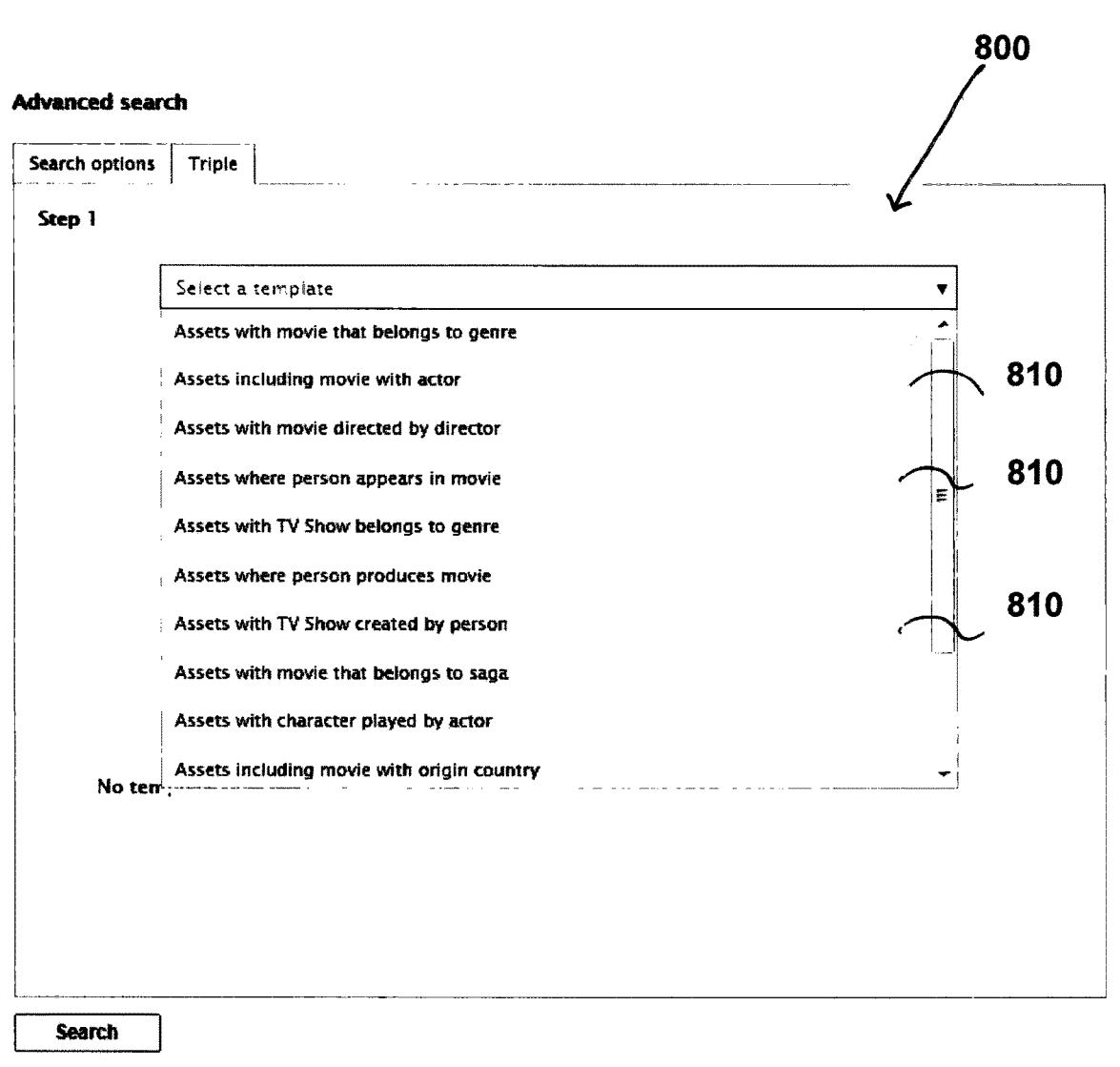

FIGS. 8A-8B are screenshots illustrating a user interface enabling a user to select a template in accordance with the present disclosure. In FIG. 8A user interface 800 is presented allowing a user to initiate a search. The user interface may be presented to a user, for example, after the user has initiated a search activity for a particular subject matter using search client 102 (see FIG. 1). This may involve accessing query generation and processing server 104 via communication network 106. In one implementation, query generation and processing server 104 hosts a webserver configured to generate and transmit to client 102 the user interfaces depicted in FIGS. 8A-8D, in which cases the user interfaces may be depicted or implemented as web pages, though any other technologies for generating user interfaces for client 102 may be utilized. The user interfaces may be hosted on a remote device, such as query generation and processing server 104 or may be local to client 102.

User interface 800 includes a pull down menu 802 that, when activated by the user provides a list of candidate templates for the current knowledge model. The user may also click upon link 804 to initiate the process for creating a new template that may be utilized in a particular search. Finally, interface 800 includes a region displaying a list of previously-used templates that may be selected by the user.

In this example, the user activates pull down menu 802 to generate a list of candidate triples that may be selected. FIG. 8B illustrates user interface 800 after the user has selected pull down menu 802 to generate a listing of candidate templates associated with the current knowledge model. In this example associated with FIG. 8B the knowledge model is associated with the domain of film, theatre, and television. As such, candidate triples 810 displayed include "Assets with movie that belongs to genre" or "Assets with movie directed by director." When the user identifies a triple that is useful for the users desired search, the user can select the triple by clicking upon the desired triple statement. In this example, the user clicks upon the triple statement "Assets including movie with actor."

Regardless of the way through which the template is selected, the template's type may be different depending on the underlying knowledge model. As described above, if the knowledge model is semantic and based on triples, one option is that the selected template is of the (C,r,C) type.

Returning to FIG. 5, once the template is chosen (or created), the user instantiates the template in order to define more accurately the restriction that will be applied to the search through the instantiated template. To instantiate the template (in step 504), the user inserts arbitrarily selected terms into the different sections of the template. For example, in the case of semantic triple-based systems where templates are in the form of (C,r,C), the concepts presented as subject (s) and object (o) in the (s,p,o) triple can be substituted by specific instances that belong to the respective concepts. Embodiments may consider providing guidance to the user by proposing candidate instances that belong to the given concept through different means.

Figure 8C:
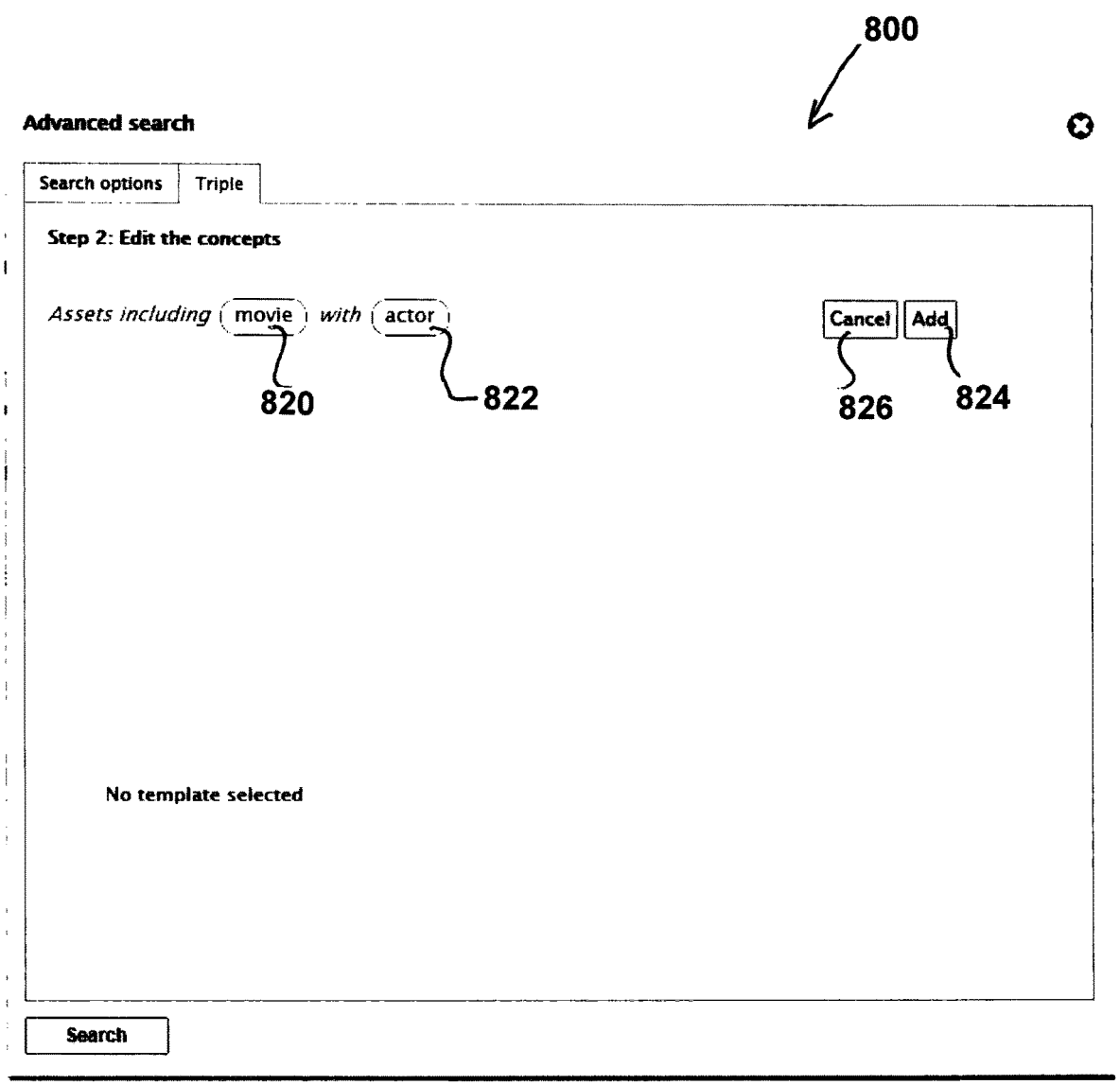

FIG. 8C depicts user interface 800 after the user has selected the desired triple. As such, the triple "Assets including movie with actor" is displayed in user interface 800. In this example, the triple includes two concepts: movie and actor. Within user interface 800 the user can click on either the word movie 820 or actor 822, which are current generic concepts. After clicking on either movie 820 or actor 822 the user is provided with an opportunity to replace the generic concept of either movie or actor with a specific instance of the concept. The user interface 800 of FIG. 8C also presents the user with an option to add 824 additional templates that can be combined with the "assets including movie with actor" template to further refine the search. Alternatively, the user can cancel 826 a particular template and remove the template from the search query.

Figure 8D:
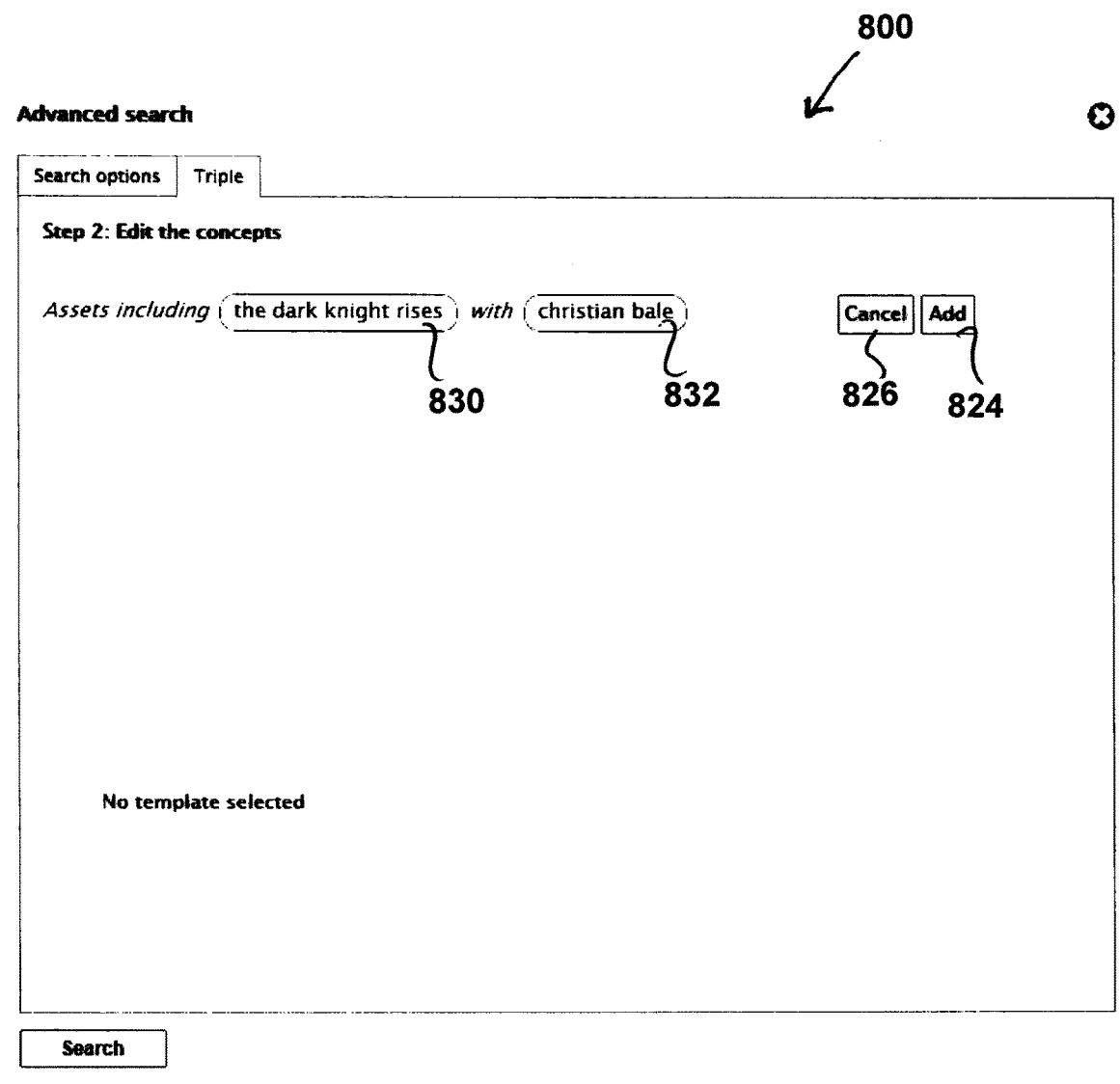

Accordingly, in FIG. 8D, the user has clicked upon the movie 820 concept and entered the specific instance 830 of "the dark night rises". Similarly, the user has clicked upon the actor 822 instance and entered the specific instance 832 of "christian bale". When entering the specific instances into the template the user may be provided with an opportunity to enter free form text. In some implementations, as the user types, potential auto-completions for the letters being typed may be displayed for selection by the user. In that case, the auto-completions may be selected from the relevant knowledge model. Alternatively, the user may select specific instances by navigating directly through a representation of the relevant knowledge model.

Figure 6:
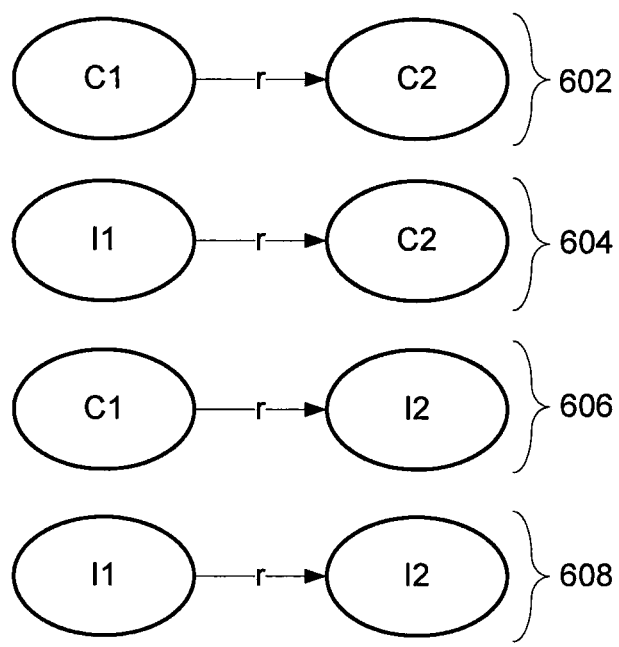
FIG. 6 is an illustration depicting the four possible query statement combinations.

In one specific implementation of the system, a semantic knowledge model in which the templates are triple-based statements is utilized. In that configuration, as discussed above, templates may be composed by two concepts and a valid relationship between those two concepts (C,r,C) selected from the knowledge model. If, in instantiating the template, the user substitute concepts for instances, there would exist four different configurations of search query statement that may be generated based upon the template. FIG. 6 is an illustration depicting the four possible query statement combinations.

Item 602 depicts a concept-relationship-concept (C,r,C) statement. In that case, none of the concepts has been instantiated (i.e., replaced with instances), so the statement that would be added to the query is identical to the corresponding template. For example, if the abstract template ("basketball player", "plays for", "team") is selected and left unchanged for the creation of statement 602, it would appear in identical form in the query. Such open statements would match all assets with any basketball player playing for any team if executed as part of a query.

Item 604 depicts an instance-relationship-concept (I,r,C) statement. In statement 604 the subject, but not the object, of the triple statement has been instantiated (i.e., replaced with a specific instance). Statement 604 is therefore more precise than statement 602. An example of such a statement would be ("Pau Gasol", "plays for", "team"), meaning that the statement, if added to an executed query, would restrict the query results to assets from the knowledge base that match the condition of a particular basketball player ("Pau Gasol") playing for any team.

Item 606 depicts a concept-relationship-instance (C,r,I) statement. Statement 606 is the opposite case to statement 604 because in statement 606 the object, but not the subject, has been instantiated (i.e., replaced with a specific instance). It is thus also more precise in terms of search restrictions than statement 602. An example of this type of statement would be ("basketball player", "plays for", "Los Angeles Lakers"), meaning that the statement, if added to an executed query, would restrict the results to those associated with any basketball player playing for a particular team ("Los Angeles Lakers").

Item 608 depicts an instance-relationship-instance (I,r,I) statement. In statement 608 both the subject and object concepts from the template are instantiated (i.e., replaced with specific instances), expressing a more precise statement than statements 602, 604, or 606. An example of such a statement would be ("Pau Gasol", "plays for", "Los Angeles Lakers"), meaning that the statement, if added to an executed query, would restrict the results to those annotated with a particular player ("Pau Gasol") playing for a particular team ("Los Angeles Lakers").

Figure 7:
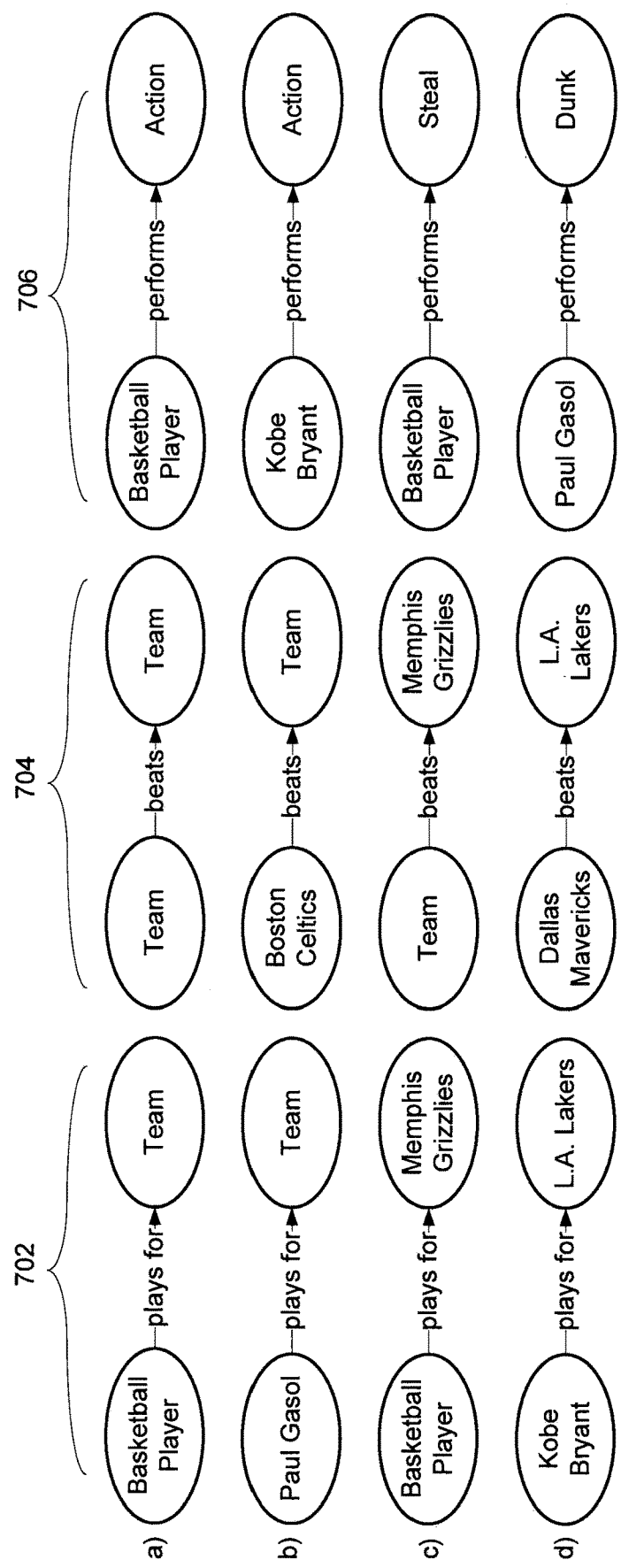
FIG. 7 is an illustration depicting example templates and potential instantiation for each of the example templates.

FIG. 7 is an illustration depicting example templates and potential instantiation for each of the example templates. FIG. 7 is made up of three columns of statements (columns 702, 704, and 706) arranged in three rows (row a), row b) and row c)). Each column represents different ways a particular template may be instantiated in the present system.

The template for column 702 consists of the triple ("basketball player", "plays for", "team"). This template might be instantiated as: a) the (C,r,C) statement which is identical to the template; b) an (I,r,C) statement like ("Pau Gasol", "plays for", "team"); c) a (C,r,I) statement like ("basketball player", "plays for", "Memphis Grizzlies"); or d) an (I,r,I) statement like ("Kobe Bryant", "plays for", "Los Angeles Lakers").

The template for column 704 consists of the triple ("team", "beats", "team"). This template can be instantiated as: a) the (C,r,C) statement that is identical to the template; b) an (I,r,C) statement like ("Boston Celtics", "beats", "team"); c) a (C,r,I) statement like ("team", "beats", "Memphis Grizzlies"); or d) an (I,r,I) statement like ("Dallas Mavericks", "beats", "Los Angeles Lakers").

The template for column 706 consists of the triple ("basketball player", "performs", "action"). This template can be instantiated as: a) the (C,r,C) statement which is identical to the template; b) an (I,r,C) statement like ("Kobe Bryant", "performs", "action"); c) a (C,r,I) statement like ("basketball player", "performs", "Steal"); or d) an (I,r,I) statement like ("Pau Gasol", "performs", "Dunk").

Independently of the type of template used and the way statements have been instantiated, the generated statements can be combined into a structured query, which can be used to perform a search. Therefore, the query can be thought of as a combination of these statements that may be formally represented as {S1∪S2 . . . ∪Sn}.

It should be noted that this manner of representing the combination of statements is just one possible mechanism for representing a query as other formal representations may be used, as well as different ways to combine the statements rather than a union. In the case of a semantic system as described in the present examples, each statement Si may be a triple in the form (s,p,o), where the subject ("s") and the object ("o") in the statements may appear either as an instance or as a concept.

With reference to FIG. 7, an example query can be constructed using statement b) of column 704 and statement d) of column 706, namely the (I,r,C) statement ("Boston Celtics", "beats", "team") and the (I,r,I) statement ("Pau Gasol", "performs", "Dunk"). A query combining those two statements would generate a result listing including items with annotations in which a particular team ("Boston Celtics") wins a match against any other team, and in which a particular player ("Pau Gasol") appears performing a particular action ("Dunk"). Formally, the query may be expressed as {S1∪S2} or {("Boston Celtics", "beats", "team")∪("Pau Gasol", "performs", "Dunk")}.

The semantic query based on the set of statements, arbitrarily represented as ({S1∪S2 . . . ∪Sn}), can be executed against a knowledge base in order to retrieve items that fulfill the conditions defined in the query. In performing the search, the annotations of the items in the knowledge base are analyzed to determine whether they satisfy the terms of the query. If so, that those items are returned in the result set.

The result of the search is an identification of items from the knowledge base that are relevant to the statements in the query. One possible way of representing the result set is as {A1 (Sa, Sb, . . . Sz), A2 (Sa', Sb', . . . Sz'), . . . An (Sa", Sb", . . . Sz")}, where Ai is an asset that satisfies the assertions in the query, and (Sa, Sb, . . . Sz) is the complete set of statements that are related to the given asset. Again, it should be noted that the actual implementation choice regarding the retrieval of assets, as well as the formal representation of the results, might be implemented in a number of different ways. For instance, it could be case that in a given implementation, assets in the resulting set are only required to fulfill one or some of the statements in the query (e.g., multiple statements may be or d together). Similarly, statements in the annotations and in the query may be slightly different, yet still be considered as a match, etc. Additionally, embodiments may order the set of results according to various criteria. For example, the items in the result set for which the assertions in the query have more weight (because those are the only statements associated with the item, or because the same assertion is associated more than once with the same item, e.g., for being associated from different parts along the length of a video) show up earlier in the results.

When matching statements in the query to those used for annotation of items in the knowledge base, matches may be identified even when the statements in the query are not identical to the annotations in the knowledge base. For example, in the case of triple-based statements, the statements can be of four general types depending on the instantiation of subject and object, namely (C,r,C), (C,r,I), (I,r,C) and (I,r,I), as illustrated in FIG. 6. For this reason, the statements in the query may be expanded and/or generalized in order to obtain all the possible matches including all the different types of statement. In performing that expansion, concepts in the query statements are expanded into all possible instance values, and instances in the query statements are generalized into the concept to which they belong. In such an implementation, a statement of the type (I,r,I) in the query such as (I1,r,I2), where instance I1 belongs to concept C1 and instance I2 belongs to concept C2, could be expanded to also match assets annotated with the statements (I1,r,C2), (C1,r,I2) or (C1,r,C2).

The following is an example of this query expansion. With reference to the query specified above {S1∪S2}={("Boston Celtics", "beats", "team")∪("Pau Gasol", "performs", "Dunk")}, the search process could return, for example, a set of three assets such as {A1 (Sa1, Sb, Sc, Sd), A2 (Sa1, Sb, Se, Sf, Sg), A3 (Sa2, Sb, Sh, Si)}. In this example, in the resulting set S2 would be Sb (i.e., all returned assets that contain an annotation for "Pau Gasol performing a dunk") and S1 would match both Sa1 ("Boston Celtics", "beats", "Los Angeles Lakers") and Sa2 ("Boston Celtics", "beats", "Memphis Grizzlies"). Sc-Si are the other statements used to annotate those three assets. For example, assuming that Sc=("Pau Gasol", "plays for", "Los Angeles Lakers") and Sd=("Kobe Bryant", "plays for", "Los Angeles Lakers"), asset A1 features a "Dunk" by "Pau Gasol" (Sb) in which him and "Kobe Bryant" are playing with "Los Angeles Lakers" (Sc, Sd) in a match lost against "Boston Celtics" (Sa1). Once again, while this particular example illustrates a very particular scenario, it should be noted that different results could have been retrieved depending on the actual implementation details of the search functionality.

In the present system, after the user has generated a number of instantiated templates or statements, the statements are combined together and executed against the knowledge base. The statements (and any other natural language terms provided by the user) may be joined in a formal query through the use of well-known query languages for semantic graph models, such as SPARQL, or other RDF query languages. Such query languages allow for the creation of queries through the use of triple patterns including both constants and variables, and are therefore suitable for the combination of statements in standard formats that cater for logical conjunctions in accordance with the present disclosure.

As a non-limiting example, the steps described above (and all methods described herein) may be performed by any central processing unit (CPU) or processor in a computer or computing system, such as a microprocessor running on a server computer, and executing instructions stored (perhaps as applications, scripts, apps, and/or other software) in computer-readable media accessible to the CPU or processor, such as a hard disk drive on a server computer, which may be communicatively coupled to a network (including the Internet). Such software may include server-side software, client-side software, browser-implemented software (e.g., a browser plugin), and other software configurations.

Although the present invention has been described with respect to preferred embodiment(s), any person skilled in the art will recognize that changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

What is claimed is:

1. A system, comprising a server hardware computing device coupled to a computer network and comprising at least one processor executing computer-executable instructions within a memory that, when executed, cause the system to:
   store:
      within a knowledge model database, a knowledge model for a knowledge domain, the knowledge model defining:
         a plurality of entities including concepts and instances, and
         a plurality of interrelationships between the plurality of entities;
      within a knowledge base, a plurality of identified items, each associated within the knowledge base with at least one annotation identifying at least one of the entities in the knowledge model; and
      within a template repository, a plurality of templates, each of the plurality of templates including a concept and a relationship from the knowledge model;
   execute a query selecting the plurality of templates from the template repository;
   generate a Graphical User Interface (GUI) comprising:
      a first GUI component configured to receive a first user input selecting a template from a list of the plurality of templates; and
      a second GUI component configured to receive a second user input replacing the concept, within the template selected, with an instance of the concept stored in the knowledge model;
   transmit the template and the GUI through the computer network to a client hardware computing device;
   receive, through the computer network from the GUI displayed on the client hardware computing device, an instantiation of the template comprising a generated query including the instance replacing the concept, and the relationship; and
   query the knowledge base, using the generated query, to identify an item in the plurality of items associated in the knowledge base with a metadata including the instance and the relationship, wherein the item is associated with an annotation including the instantiation.

2. The system of claim 1, wherein the template includes two concepts and a relationship from the knowledge model.

3. The system of claim 2, wherein the template includes two concepts and a relationship between the two concepts, and the instantiation of the template includes a specific instance, from the knowledge model, of each of the two concepts.

4. The system of claim 1, wherein the knowledge model database is configured as a triplestore.

5. The system of claim 1, wherein the computer-executable instructions further cause the system to transmit a result listing including the item to the client hardware computing device.

6. The system of claim 1, wherein the computer-executable instructions further cause the system to:
   transmit a second template, derived from the instantiation of the template, to the client hardware computing device; and
   receive, from the client hardware computing device, a second instantiation of the second template.

7. The system of claim 6, wherein the computer-executable instructions further cause the system to query the knowledge base using the second instantiation.

8. A system, comprising a server hardware computing device coupled to a computer network and comprising at least one processor executing computer-executable instructions within a memory that, when executed, cause the system to:
   execute a query selecting a template from a template repository, wherein:
      the template is stored among a plurality of templates within a template repository,
      each of the plurality of templates includes a concept and a relationship from a knowledge model, and
      the knowledge model defines:
         a plurality of entities including concepts and instances, and
         a plurality of interrelationships between the plurality of entities;

generate a Graphical User Interface (GUI) comprising:
- a first GUI component configured to receive a first user input selecting the template from a list of the plurality of templates; and
- a second GUI component configured to receive a second user input replacing the concept, within the template selected, with an instance of the concept stored in the knowledge model;

transmit the template and the GUI through the computer network to a client hardware computing device;

receive, through the computer network, from the GUI displayed on the client hardware computing device, an instantiation of the template comprising a generated query including the instance replacing the concept, and the relationship; and query a knowledge base, comprising a plurality of items each associated with at least one annotation identifying at least one of the entities in the knowledge model and using the generated query, to identify an item in the knowledge base, the knowledge base identifying the item in the plurality of items associated in the knowledge base with a metadata including the instance and the relationship, wherein the item is associated with an annotation including the instantiation.

9. The system of claim 8, wherein the template includes two concepts and a relationship from the knowledge model.

10. The system of claim 9, wherein the template includes two concepts and a relationship between the two concepts, and the instantiation of the template includes a specific instance, from the knowledge model, of each of the two concepts.

11. The system of claim 8, wherein a knowledge model database containing the knowledge model is configured as a triplestore.

12. The system of claim 8, wherein the computer-executable instructions further cause the system to:
- transmit a second template, derived from the instantiation of the template, to the client hardware computing device,
- receive, from the client hardware computing device, a second instantiation of the second template.

13. The system of claim 8, wherein the computer-executable instructions further cause the system to query the knowledge base using the second instantiation.

14. A method, comprising the steps of:
executing, by a server hardware computing device coupled to a computer network and comprising at least one processor executing computer-executable instructions within a memory, a query selecting a template from a template repository, wherein:
- the template is stored among a plurality of templates within a template repository,
- each of the plurality of templates includes a concept and a relationship from a knowledge model,
- the knowledge model defines:
  - a plurality of entities including concepts and instances, and
  - a plurality of interrelationships between the plurality of entities;

generating, by the server hardware computing device, a Graphical User Interface (GUI) comprising:
- a first GUI component configured to receive a first user input selecting the template from a list of the plurality of templates; and
- a second GUI component configured to receive a second user input replacing the concept, within the template selected, with an instance of the concept stored in the knowledge model;

transmitting, by the server hardware computing device, the template and the GUI through the computer network to a client hardware computing device;

receiving, by the server hardware computing device through the computer network, from the client hardware computing device, an instantiation of the template comprising a generated query including the instance replacing the concept, and the relationship; and querying, by the server hardware computing device, a knowledge base, comprising a plurality of items each associated with at least one annotation identifying at least one of the entities in the knowledge model and using the generated query, to identify an item in the knowledge base, the knowledge base identifying the item in the plurality of items associated in the knowledge base with a metadata including the instance and the relationship and associated with an annotation including the instantiation.

15. The method of claim 14, wherein the template includes two concepts and a relationship from the knowledge model.

16. The method of claim 15, wherein the template includes two concepts and a relationship between the two concepts, and the instantiation of the template includes a specific instance, from the knowledge model, of each of the two concepts.

17. The method of claim 14, wherein a knowledge model database containing the knowledge model is configured as a triplestore.

18. The method of claim 14, further comprising the steps of:
- transmitting, by the server hardware computing device, a second template, derived from the instantiation of the template, to the client hardware computing device, and
- receiving, by the server hardware computing device, from the client hardware computing device, a second instantiation of the second template.

19. The method of claim 14, further comprising the step of querying the knowledge base using the second instantiation.

* * * * *